United States Patent
Zhao et al.

(10) Patent No.: US 10,043,504 B2
(45) Date of Patent: Aug. 7, 2018

(54) KARAOKE PROCESSING METHOD, APPARATUS AND SYSTEM

(71) Applicant: GUANGZHOU KUGOU COMPUTER TECHNOLOGY CO., LTD., Guangzhou, Guangdong (CN)

(72) Inventors: Weifeng Zhao, Guangdong (CN); Chun Li, Guangdong (CN); Xiang Liu, Guangdong (CN); Baohua Wang, Guangdong (CN); Meixing Wang, Guangdong (CN); Zhiyong Liu, Guangdong (CN); Siliang Huang, Guangdong (CN); Fei Zheng, Guangdong (CN); Xiangwen Chen, Guangdong (CN); Bo Song, Guangdong (CN); Haojie Xu, Guangdong (CN); Li Cao, Guangdong (CN); Tianwen Li, Guangdong (CN); Weilong Wang, Guangdong (CN); Xiaokang Deng, Guangdong (CN); Shengmin Tan, Guangdong (CN); Hongcheng Fu, Guangdong (CN); Qing Zhang, Guangdong (CN)

(73) Assignee: GUANGZHOU KUGOU COMPUTER TECHNOLOGY CO., LTD., Gangzhou, Guangdong (CN)

(*) Notice: Subject to any disclaimer, the term of this patent is extended or adjusted under 35 U.S.C. 154(b) by 0 days.

(21) Appl. No.: 15/576,540

(22) PCT Filed: May 11, 2016

(86) PCT No.: PCT/CN2016/081650
§ 371 (c)(1),
(2) Date: Nov. 22, 2017

(87) PCT Pub. No.: WO2016/188322
PCT Pub. Date: Dec. 1, 2016

(65) Prior Publication Data
US 2018/0158442 A1 Jun. 7, 2018

(30) Foreign Application Priority Data
May 27, 2015 (CN) .......................... 2015 1 0280087

(51) Int. Cl.
G10H 1/36 (2006.01)
G10H 1/00 (2006.01)

(52) U.S. Cl.
CPC ........... G10H 1/365 (2013.01); G10H 1/0008 (2013.01); *G10H 2210/005* (2013.01)

(58) Field of Classification Search
CPC .......................... G10H 1/365; G10H 1/0008
(Continued)

(56) References Cited

U.S. PATENT DOCUMENTS 6,083,009 A * 7/2000 Kim .................. G10H 1/365
434/307 A
6,514,083 B1 * 2/2003 Kumar ................. G10H 1/365
386/285

(Continued)

FOREIGN PATENT DOCUMENTS

CN   101859561 A   10/2010
CN   102456340 A * 5/2012

(Continued)

OTHER PUBLICATIONS

International Search Report and Written Opinion (in Chinese with English Translation) for PCT/CN2016/081650, dated Jul. 22, 2016; ISA/CN, Haidian District, Beijing.

*Primary Examiner* — David Warren
*Assistant Examiner* — Christina Schreiber
(74) *Attorney, Agent, or Firm* — Harness, Dickey & Pierce, P.L.C.

(57) ABSTRACT

A karaoke processing method, a karaoke processing apparatus and a karaoke processing system are provided. The method includes: acquiring an accompaniment audio file, an original vocal audio file and a lyrics file of a song, where the lyrics file includes time information for identifying display time of lyrics; dividing the lyrics file to obtain a first and a second lyrics parts and generating lyrics division information; generating a target audio file by outputting the accompaniment audio file in the display time of the first lyrics part and outputting the original vocal audio file in the display time of the second lyrics part; and sending the target audio file and a target lyrics file to a client upon reception of a karaoke request sent by the client, where the target lyrics file is obtained by adding the lyrics division information in the lyrics file.

19 Claims, 4 Drawing Sheets

(58) Field of Classification Search
USPC .......................................................... 84/610
See application file for complete search history.

(56) References Cited

U.S. PATENT DOCUMENTS

| | | | | |
|---|---|---|---|---|
| 6,520,776 B1* | 2/2003 | Furukawa | ............... | G10H 1/361 |
| | | | | 341/176 |
| 6,931,377 B1* | 8/2005 | Seya | .................... | G10H 1/0041 |
| | | | | 434/307 A |
| 6,971,882 B1* | 12/2005 | Kumar | ............... | G09B 19/0015 |
| | | | | 345/630 |
| 9,858,910 B2* | 1/2018 | Xiao | ...................... | G10H 1/365 |
| 2002/0144588 A1* | 10/2002 | Naples | .................. | G10H 1/365 |
| | | | | 84/609 |
| 2003/0126973 A1* | 7/2003 | Kung | ..................... | G10H 1/365 |
| | | | | 84/610 |
| 2008/0070203 A1* | 3/2008 | Franzblau | ................ | G09B 5/02 |
| | | | | 434/157 |
| 2009/0265163 A1* | 10/2009 | Li | .......................... | G06Q 10/10 |
| | | | | 704/10 |
| 2010/0203491 A1* | 8/2010 | Yoon | ...................... | G06Q 99/00 |
| | | | | 434/307 A |
| 2010/0304863 A1* | 12/2010 | Applewhite | ........... | G10H 1/368 |
| | | | | 463/36 |
| 2011/0276333 A1* | 11/2011 | Wang | ................ | G06F 17/30861 |
| | | | | 704/270 |
| 2014/0000441 A1* | 1/2014 | Miyajima | ............. | G10H 1/0008 |
| | | | | 84/609 |
| 2014/0358566 A1* | 12/2014 | Zhang | .................... | G11B 27/00 |
| | | | | 704/500 |
| 2016/0300557 A1* | 10/2016 | Xiao | ....................... | G11B 27/10 |
| 2017/0053642 A1* | 2/2017 | Yamamoto | ........... | G10L 13/033 |
| 2017/0301329 A1* | 10/2017 | Yang | ....................... | G10H 1/366 |
| 2017/0332020 A1* | 11/2017 | Ouyang | ................. | H04N 5/272 |
| 2018/0090116 A1* | 3/2018 | Zhao | ....................... | G10H 1/361 |

FOREIGN PATENT DOCUMENTS

| | | |
|---|---|---|
| CN | 102456340 A | 5/2012 |
| CN | 102497448 A | 6/2012 |
| CN | 103165119 A | 6/2013 |
| CN | 104966527 A | 10/2015 |

* cited by examiner

KARAOKE PROCESSING METHOD, APPARATUS AND SYSTEM

The present application is the national phase of International Patent Application No. PCT/CN2016/081650, filed on May 11, 2016, which claims the priority to Chinese Patent Application No. 201510280087.7, titled "KARAOKE PROCESSING METHOD, APPARATUS AND SYSTEM", filed on May 27, 2015 with the Chinese State Intellectual Property Office, both of which are incorporated herein by reference in their entireties.

TECHNICAL FIELD

The present disclosure relates to the field of audio processing, and in particular to a karaoke processing method and apparatus and a karaoke processing system.

BACKGROUND

With the improvement of the quality of life of people, karaoke applications are used more and more in people's daily life, with increasingly rich functions.

The karaoke application is a combination of a music player and recording software, which can play an original vocal, record the song of the user, and mix the recorded song with accompaniment to obtain a music file. The user can further upload the above-described music file to the Internet, so that more people hear his/her song.

Typically, when the user records his/her song, the karaoke application provides an accompaniment audio file to serve as accompaniment for recording the song of the user. However, in this way, the user can only sing alone, while cannot have the karaoke experience of singing with a star.

SUMMARY

A karaoke processing method, a karaoke processing apparatus and a karaoke processing system are provided according to the embodiments of the present disclosure, to realize the karaoke experience of singing with a star.

A karaoke processing method is provided according to a first aspect of the embodiments of the present disclosure, which includes:

acquiring, by a server, an accompaniment audio file, an original vocal audio file and a lyrics file of a song, where the lyrics file includes time information for identifying display time of lyrics;

dividing, by the server, the lyrics file to obtain a first lyrics part and a second lyrics part and generating lyrics division information, where the lyrics division information includes identification information for identifying the first lyrics part;

generating, by the server, a target audio file by outputting the accompaniment audio file in the display time of the first lyrics part and outputting the original vocal audio file in the display time of the second lyrics part; and sending, by the server, the target audio file and a target lyrics file to a client upon reception of a karaoke request sent by the client, where the target lyrics file is obtained by adding the lyrics division information in the lyrics file.

A karaoke processing method is provided according to a second aspect of the embodiments of the present disclosure, which includes:

an acquisition unit configured to acquire an accompaniment audio file, an original vocal audio file and a lyrics file of a song, where the lyrics file includes time information for identifying display time of lyrics;

a processing unit configured to divide the lyrics file to obtain a first lyrics part and a second lyrics part, and generate lyrics division information, where the lyrics division information includes identification information for identifying the first lyrics part;

a generation unit configured to generate a target audio file by outputting the accompaniment audio file in the display time of the first lyrics part and outputting the original vocal audio file in the display time corresponding to the second lyrics part; and a sending unit configured to send the target audio file and a target lyrics file to a client upon reception of a karaoke request sent by the client, where the target lyrics file is obtained by adding the lyrics division information in the lyrics file.

A karaoke processing system is provided according to a third aspect of the embodiments of the present disclosure, which includes a server and a client.

The server includes the karaoke processing device according to the second aspect.

The client is configured to provide karaoke service to a user by using the target audio file as accompaniment audio and using the target lyrics file as lyrics to be played.

In the technical solution according to the embodiment of the present disclosure, the server first acquires an accompaniment audio file, an original vocal audio file and a lyrics file of a song, where the lyrics file includes time information for identifying a display time of lyrics. Then the lyrics file is divided to obtain the first lyrics part and the second lyrics part, and lyrics division information is generated, where the lyrics division information includes identification information for identifying the first lyrics part. Then a target audio file is generated by outputting the accompaniment audio file in the display time of the first lyrics part and outputting the original vocal audio file in the display time corresponding to the second lyrics part. Accordingly, upon reception of the karaoke request sent by a client, the server sends the target audio file and the lyrics division information to the client so that the client provides karaoke service to the user by using the target audio file as the accompaniment audio and based on the above-described lyrics division information. In the embodiment of the present disclosure, the target audio file sent by the server to the client includes the accompaniment in the display time of the first lyrics part, and the original vocal in the display time of the second lyrics part. Therefore, in the embodiment of the present disclosure, it can be realized that the song is sung by the user in the display time of the first lyrics part, and originally sung by the star in the display time of the second lyrics part, thereby providing the karaoke experience of singing with the star.

DETAILED DESCRIPTION OF THE EMBODIMENTS

A karaoke processing method and apparatus and a karaoke processing system are provided according to embodiments of the present disclosure, to realize the karaoke experience of singing with a star, which are described in detail respectively as follows.

The technical solutions according to the embodiments of the present disclosure will be described clearly and completely as follows in conjunction with the drawings in the embodiments of the present disclosure. It is apparent that the described embodiments are only a part of the embodiments according to the present disclosure, rather than all the embodiments. Any other embodiments obtained by those skilled in the art based on the embodiments in the present disclosure without any creative efforts fall within the scope of protection of the present disclosure.

The terms "first", "second", "third", "fourth" and the like (if present) in the specification and claims of the present disclosure and the above-described drawings are intended to distinguish between similar objects and not necessary to describe specific order or sequence. It is to be understood that the data thus used is interchangeable where appropriate so that the embodiments described herein can be implemented in an order other than the content illustrated or described herein. In addition, the terms "include" and "have" and any variations thereof are intended to cover non-exclusive inclusion, for example, processes, methods, systems, products or devices that include a series of steps or units are not necessarily limited to those steps or units clearly listed, but may include other steps or units that are not clearly listed or inherent to these processes, methods, products, or devices.

It should be noted that the client in the embodiment of the present disclosure may be a mobile phone, a personal computer (PC, Personal Computer) and/or a tablet computer. In practical implementation, one can log into a web page via the clients, or load the program on the clients, or use applications (App, Application) issued from various mobile platforms to access the karaoke service.

In the embodiment of the present disclosure, the server is connected to the client via the network. The server may be set up by service providers (for example, karaoke service providers, etc.) to manage and operate the provided services, including various servers.

Figure 1:
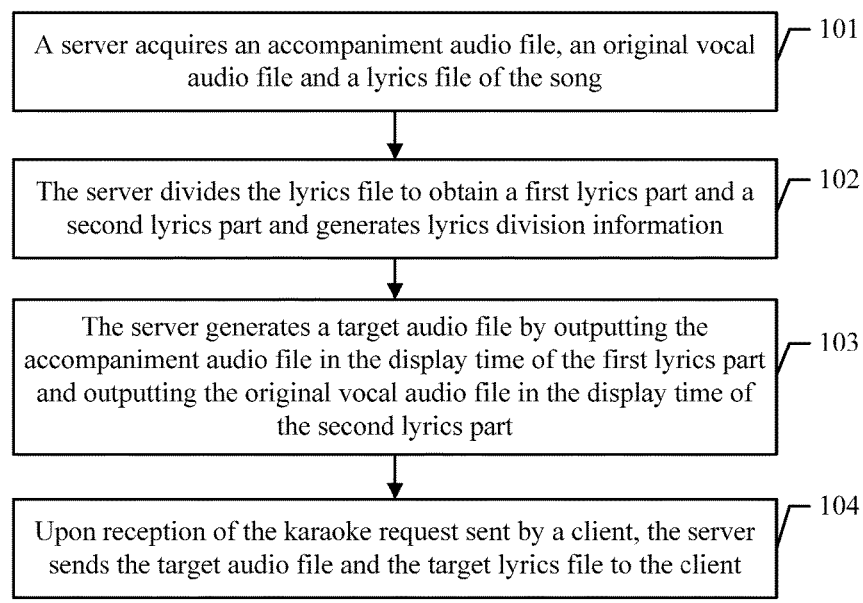
FIG. 1 is a schematic diagram of a karaoke processing method according to an embodiment of the present disclosure.

Referring to FIG. 1, an embodiment of a karaoke processing method in the embodiment of the present disclosure includes the following steps 101 to 104.

In step 101, the server acquires an accompaniment audio file, an original vocal audio file and a lyrics file of a song.

In the embodiment, both the accompaniment audio file and the original vocal audio file are raw audio data. In practical application, in a case that the obtained accompaniment audio file or the original vocal audio file are audio data in a compressed format, such as the mp3 format, the server decompresses the audio data in the compressed format to obtain the raw audio data.

It should be noted that, in the embodiment, the lyrics file includes time information for identifying the display time of lyrics so that the lyrics file is synchronized with the accompaniment audio file and the original vocal audio file based on the time information. For example, the lyrics file may include an LRC lyrics file that contains time tags for identifying the display time of lyrics.

In step 102, the server divides the lyrics file to obtain a first lyrics part and a second lyrics part and generates lyrics division information.

In the embodiment, the server may divide the lyrics file by various methods to obtain the first lyrics part and the second lyrics part, which are illustrated respectively as follows.

In a first method, the server determines paragraph information of the lyrics file based on the time information, then divides the lyrics file based on the paragraph information to obtain the first lyrics part and the second lyrics part.

In the embodiment, the time information of the lyrics file may reflect a starting point and an end point of the display time corresponding to each paragraph of the song. Therefore, the server may determine the number of paragraphs included by the lyrics file and the starting point and the end point of the display time corresponding to each paragraph based on the time information. When dividing the lyrics file based on the above-described paragraph information, the server may take at least one preset paragraph as the first lyrics part and the other part as the second lyrics part. The number of paragraphs of the first lyrics part and the specific paragraph(s) in the first lyrics part are not limited herein. For example, a structure of the paragraph information may be represented as:

```
typedef struct section_info {
    int section_id; //paragraph id
    int start_ms; //staring time ms
    int end_ms; //ending time ms
    int role_id; //role id
} Ssection, *PSection;
```

In the structure, the role id indicates whether the section corresponds to a female vocal part or a male vocal part. It is preferable that the paragraph corresponding to the female vocal part may be set as the first lyrics part or the second lyrics part, so as to divide the lyrics based on the male and female roles to obtain the first lyrics part and the second lyrics part of the different roles.

In a second method, the server determines a verse part and a refrain part of the lyrics file, and determines the verse part as the first lyrics part and the refrain part as the second lyrics part, or determines the refrain part as the lyrics part and the verse part as the second lyrics part.

In the present embodiment, the server may divide the lyrics based on the difference between the refrain and the verse so as to obtain the first lyrics part corresponding to the verse and the second lyrics part corresponding to the refrain, or obtain the first lyrics part corresponding to the refrain and the second lyrics part corresponding to the verse.

In a third method, the server divides the lyrics file based on a custom template, to obtain the first lyrics part and the second lyrics part.

In the present embodiment, the server may customize in advance multiple templates for dividing the lyrics, and then divides the lyrics files based on the above-described custom templates to obtain the first lyrics part and the second lyrics part. For example, the fixed N sentences of lyrics or N words are set as the first lyrics part. The specific method for setting the custom template is not limited here, and those skilled in the art can set a variety of different templates according to the actual situation.

It is to be noted that, in the present embodiment, the above is only a few examples of how to divide the lyrics file to obtain the first lyrics part and the second lyrics part. In practice, the server may combine the above-described division methods, or may use other division methods, which is not limited here.

Optionally, in the present embodiment, before performing step 102, the server may receive a division instruction sent by the client for instructing a division method specified by the user. Then the server divides the lyrics file based on the division instruction to obtain the first lyrics part and the second lyrics part, thereby allowing the user to choose how to divide the lyrics, and obtaining the first lyrics part and the second lyrics part as desired by the user.

In the present embodiment, after the first lyrics part and the second lyrics part are obtained by the division processing, the server further records the division result to generate lyrics division information, where the lyrics division information includes identification information for identifying the first lyrics part. Here, since the lyrics consists of two parts in total, the server, the client or the like can identify the corresponding second lyrics part with the identification information identifying the first lyrics part. Apparently, in other embodiments, the lyrics division information may further include identification information for identifying the second lyrics part.

In step 103, the server generates a target audio file by outputting the accompaniment audio file in the display time of the first lyrics part and outputting the original vocal audio file in the display time of the second lyrics part.

In the present embodiment, during the process of generating the target audio file, the accompaniment audio file is outputted in the display time corresponding to the first lyrics part to acquire the audio data of the accompaniment audio file in the corresponding time period. The original vocal audio file is outputted in the display time corresponding to the second lyrics part to acquire the audio data of the original vocal audio file in the corresponding time period. Then the audio data at each time point are synthesized to an audio file in accordance with the time sequence. The synthesized audio file is the target audio file. It is to be emphasized that, during the process of generating the target audio file described above, which audio data of the accompaniment audio file and the original vocal audio file is to be outputted in which time period is determined based on the display time of the lyrics. Thereby, when the target audio file is played, the accompaniment is outputted in the display time corresponding to the first lyrics part, and the original vocal is outputted in the display time corresponding to the second lyrics part. That is, the target audio file can be automatically switched between the accompaniment and the original vocal.

Optionally, in the present embodiment, the method may further include: performing, by the server, balance processing on the audio data of the target audio file at the switching point. Specifically, the switching point refers to the time point for switching from the display time corresponding to the first lyrics part to the display time corresponding to the second lyrics part or the time point for switching from the display time corresponding to the second lyrics part to the display time corresponding to the first lyrics part. Here, since the target audio file is obtained by splicing two audio files, the audio quality of the target audio file can be ensured by performing the balance processing at the splicing point. In the present embodiment, the conventional audio splicing technology may be adopted as the balance processing method, such as average filtering, superposition processing, and the like.

In step 104, upon reception of the karaoke request sent by a client, the server sends the target audio file and a target lyrics file to the client, where the target lyrics file is obtained by adding the lyrics division information in the lyrics file.

In the present embodiment, upon reception of the karaoke request sent by the client, the server sends the target audio file and the target lyrics file to the client so that the client provides karaoke service to the user by using the target audio file as the accompaniment audio and using the target lyrics file as the lyrics to be played, where the target lyrics file is obtained by adding the lyrics division information in the above-described lyrics file. In the present embodiment, when the client plays the target audio data, the accompaniment is outputted in the display time of the first lyrics part, and the original vocal is outputted in the display time of the second lyrics part. Thereby, the song is sung by the user in the display time of the first lyrics part, and is originally sung by a star in the display time of the second lyrics part, realizing the karaoke experience of singing with the star. It is to be understood that in this embodiment, the target audio file and the target lyrics file are generated only by the server, and then sent to the client, thereby providing the karaoke experience of singing with the star without changing the client logic.

In the technical solution according to the embodiment of the present disclosure, the server first acquires the accompaniment audio file, the original vocal audio file and the lyrics file of the song, where the lyrics file includes time information for identifying the display time of lyrics. Then the lyrics file is divided to obtain the first lyrics part and the second lyrics part, and the lyrics division information is generated, where the lyrics division information includes identification information for identifying the first lyrics part. Then a target audio file is generated by outputting the accompaniment audio file in the display time corresponding to the first lyrics part and outputting the original vocal audio file in the display time corresponding to the second lyrics part. Thereby, upon reception of the karaoke request sent by the client, the server sends the target audio file and the lyrics division information to the client so that the client provides the karaoke service to the user by using the target audio file as the accompaniment audio and based on the above-described lyrics division information. In the embodiment of the present disclosure, the target audio file sent by the server to the client includes the accompaniment in the display time of the first lyrics part, and the original vocal in the display time of the second lyrics part so that it can be realized that the song is sung by the user in the display time of the first lyrics part, and is originally sung by the star in the display time of the second lyrics part, thereby providing the karaoke experience of singing with the star.

Figure 2:
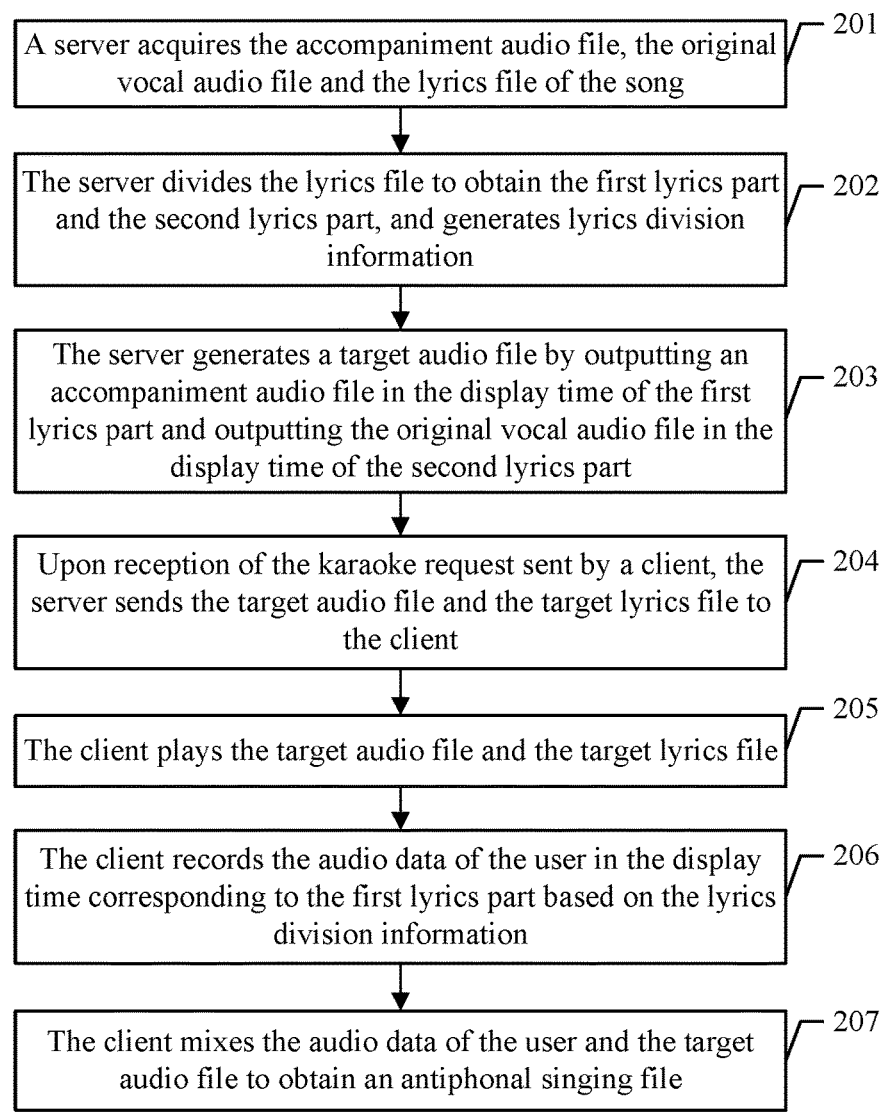
FIG. 2 is a schematic diagram of a karaoke processing method according to another embodiment of the present disclosure.

Next, based on the embodiment shown in FIG. 1, it is further described how the client provides the karaoke service to the user by using the target audio file as the accompaniment audio and using the target lyrics file as the lyrics to be played. Referring to FIG. 2, a karaoke processing method according to another embodiment of the present disclosure includes the following steps 201 to 207.

In step 201, the server acquires the accompaniment audio file, the original vocal audio file and the lyrics file of the song.

In step 202, the server divides the lyrics file to obtain the first lyrics part and the second lyrics part.

In step 203, the server generates a target audio file by outputting an accompaniment audio file in the display time of the first lyrics part and outputting the original vocal audio file in the display time of the second lyrics part.

In step 204, upon reception of the karaoke request sent by a client, the server sends the target audio file and a target lyrics file to the client, where the target lyrics file is obtained by adding the lyrics division information in the lyrics file.

In the present embodiment, the processes of steps 201 to 204 are the same as those of steps 101 to 104 in the embodiment shown in FIG. 1, and will not be described here.

In step 205, the client plays the target audio file and the target lyrics file.

In the present embodiment, after the target audio file and the target lyrics file sent by the server is received by the client, the karaoke application on the client plays the above-described target audio file and the target lyrics file, where the target audio file is played as the accompaniment audio.

In order to help a user to quickly identify which part of the lyrics is for him/her to sing and which part of the lyrics is to be sung by the star, the client may further identify the lyrics displayed on the client. Preferably, in the embodiment, the client may further provide, based on the lyrics division information, a first identifier for the first lyrics part displayed on the client, and a second identifier for the second lyrics part displayed on the client. It is to be understood that the above-described identifier may be a color identifier, for example, the first lyrics part is displayed with a color and the second lyrics part is displayed with another color. Alternatively, the above-described identifier is a highlighted state identifier, for example, the first lyrics part is displayed in the highlighted state, and the second lyrics part is displayed in a non-highlighted state. The specific form of the identifier is not limited herein, and other identification form may be obtained by those skilled in the art as required.

In step 206, the client records, based on the lyrics division information, the audio data of the user in the display time corresponding to the first lyrics part.

In the present embodiment, the client may identify the display time corresponding to the first lyrics part and the display time corresponding to the second lyrics part based on the lyrics division information, and record the audio data of the user in the display time corresponding to the first lyrics part, and stop recording in the display time corresponding to the second player part, at which time the target audio file played by the client corresponds to the original vocal of the star. Thereby, it can be realized that the song is sung by the user in the display time of the first lyrics part, and is originally sung by the star in the display time of the second lyrics part, providing the karaoke experience of singing with the star.

In step 207, the client mixes the audio data of the user and the target audio file to obtain an antiphonal singing file.

In the present embodiment, the obtained antiphonal singing file includes the audio data of the singing of the user in the display time of the first lyrics part, and the audio data of original vocal of the star in the display time of the second lyrics part (that is, the audio data of the original vocal audio file in the corresponding time period). Optionally, in the present embodiment, the user may also upload the antiphonal singing file to the Internet by the client so as to share with others the song he/she sings with the star.

In the present embodiment, the specific process of the mixing processing may be performed by using the conventional mixing algorithm of, for example, adding the data at corresponding sampling points and dividing the sum by two.

Figure 3:
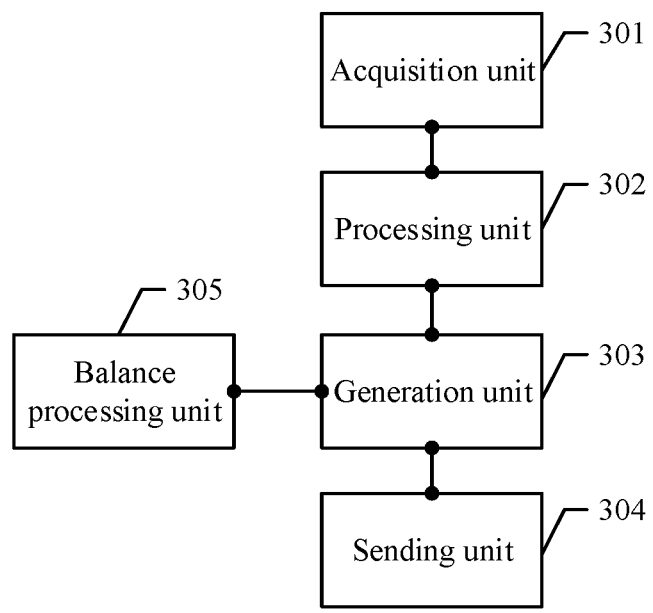
FIG. 3 is a schematic diagram of a karaoke processing device according to an embodiment of the present disclosure.

The karaoke processing method in the embodiment of the present disclosure has been described above, and the karaoke processing device in the embodiment of the present disclosure will be described below. Referring to FIG. 3, the karaoke processing device according to an embodiment of the present disclosure includes an acquisition unit 301, a processing unit 302, a generation unit 303 and a sending unit 304.

The acquisition unit 301 is configured to acquire an accompaniment audio file, an original vocal audio file and a lyrics file of a song, where the lyrics file includes time information for identifying the display time of the lyrics.

The processing unit 302 is configured to divide the lyrics file to obtain a first lyrics part and a second lyrics part and generate lyrics division information, where the lyrics division information includes identification information for identifying the first lyrics part.

The generation unit 303 is configured to generate a target audio file by outputting the accompaniment audio file in the display time of the first lyrics part and outputting the accompaniment audio file in the display time of the second lyrics part.

The sending unit 304 is configured to send the target audio file and a target lyrics file to a client upon reception of a karaoke request sent by the client so that the client provides karaoke service to the user by using the target audio file as the accompaniment audio and using the target lyrics file as the lyrics to be played, where the target lyrics file is obtained by adding the lyrics division information in the lyrics file.

For better understanding, the operation flow of the karaoke processing device in the present embodiment will be described in the following with a specific application scenario as an example.

The acquisition unit 301 acquires the accompaniment audio file, the original vocal audio file and the lyrics file of the song, where the lyrics file includes time information for identifying the display time of lyrics. The processing unit 302 divides the lyrics file to obtain the first lyrics part and the second lyrics part, and generates the lyrics division information, where the lyrics division information includes identification information for identifying the first lyrics part. The generation unit 303 generates a target audio file by outputting the accompaniment audio file in the display time corresponding to the first lyrics part and outputting the original vocal audio file in the display time corresponding to the second lyrics part. Upon reception of the karaoke request sent by the client, the sending unit 304 sends the target audio file and a target lyrics file to the client so that the client provides karaoke service to the user by using the target audio file as the accompaniment audio and using the target lyrics file as the lyrics to be played, where the target lyrics file is obtained by adding the lyrics division information in the lyrics file.

In the technical solution according to the embodiment of the present disclosure, the acquisition unit 301 first acquires the accompaniment audio file, the original vocal audio file, and the lyrics file of the song, where the lyrics file includes time information for identifying the display time of the lyrics. Then the processing unit 302 divides the lyrics file to obtain a first lyrics part and a second lyrics part and generates the lyrics division information, where the lyrics division information includes identification information for identifying the first lyrics part. Then the target audio file is generated by the generation unit 303 by outputting the accompaniment audio file in the display time of the first lyrics part and outputting the original vocal audio file in the display time of the second lyrics part. Thereby, upon reception of the karaoke request sent by the client, the sending unit 304 sends the target audio file and the lyrics division information to the client so that the client provides the karaoke service to the user by using the target audio file as the accompaniment audio and based on the above-described lyrics division information. The target audio file sent by the karaoke processing device in the server according to the embodiment of the present disclosure to the client includes the accompaniment in the display time of the first lyrics part, and the original vocal in the display time of the second lyrics part. Therefore, with the embodiment of the present disclosure, it can be realized that the song is sung by the user in the first lyrics part of the display time, and is originally sung by the star in the display time of the second lyrics part, thereby providing the karaoke experience of singing with the star.

Optionally, in the present embodiment, the processing unit 302 may be configured to determine paragraph information of the lyrics file based on the time information, and divide the lyrics file based on the paragraph information to obtain a first lyrics part and the second lyrics part.

Optionally, in the present embodiment, the processing unit 302 may be configured to determine a verse part and a refrain part of the lyrics file, and determine the verse part as the first lyrics part and the refrain part as the second lyrics part, or determine the refrain part as the first lyrics part and the verse part as the second lyrics part.

Optionally, in the present embodiment, the processing unit 302 may be configured to divide the lyrics file based on a custom template to obtain a first lyrics part and a second lyrics part.

Optionally, in the present embodiment, the karaoke processing device may further include a balance processing unit 305.

The balance processing unit 305 is configured to perform balance processing on the audio data of the target audio file at a switching point, where the switching point refers to the time point for switching from the display time corresponding to the first lyrics part to the display time corresponding to the second lyrics part or the time point for switching from the display time corresponding to the second lyrics part to the display time corresponding to the first lyrics part.

Figure 4:
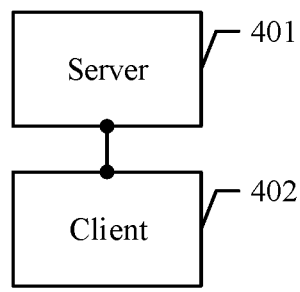
FIG. 4 is a schematic diagram of a karaoke processing system according to an embodiment of the present disclosure.

The karaoke processing method and the karaoke processing device in the embodiment of the present disclosure have been described above, and the karaoke processing system in the embodiment of the present disclosure will be described below. Referring to FIG. 4, the karaoke processing system according to an embodiment of the present disclosure includes a server and a client.

The server 401 includes the karaoke processing device as described in the embodiment shown in FIG. 3.

The client 402 is configured to provide the karaoke service to the user by using the target audio file as the accompaniment audio and using the target lyrics file as the lyrics to be played.

Optionally, in the present embodiment, the client may be configured to play the target audio file and the target lyrics file, record the audio data of the user in the display time corresponding to the first lyrics part based on the lyrics division information; and mixes the audio data of the user and the target audio file to obtain an antiphonal singing file.

Optionally, in the present embodiment, the client may further be configured to provide, based on the lyric division information, a first identifier for the first lyrics part displayed on the client and a second identifier for the second lyrics part displayed on the client.

It will be apparent to those skilled in the art that, for convenience and simplicity of description, the specific processes of the above-described system, device and unit are not described here, and one may refer to the corresponding processes in the foregoing embodiments of the method for details.

Figure 5:
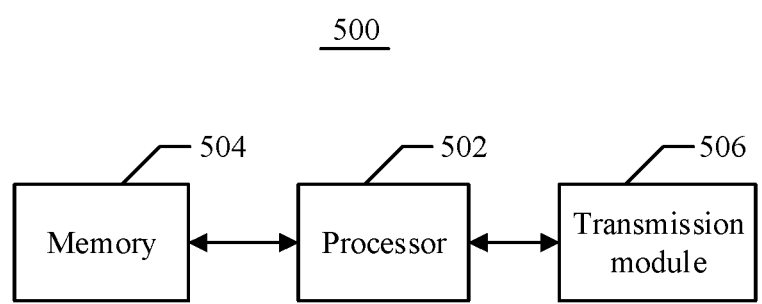
FIG. 5 is a schematic structural diagram of a server to which a karaoke processing method is applied according to an embodiment of the present disclosure.

Reference is made to FIG. 5, which shows a schematic structural diagram of a server to which the above-described karaoke processing method is applied according to an embodiment of the present disclosure. In the present embodiment, the server is implemented as a computer or a similar computing device.

As shown in FIG. 5, the computing device 500 includes one or more (only one is shown) processors 502, a memory 504 and a transmission module 506. It may be understood by those skilled in the art that the structure shown in FIG. 5 is merely illustrative and does not limit the structure of the above-described electronic device. For example, the computing device 500 may also include more or fewer components than those shown in FIG. 5, or have a different configuration from that shown in FIG. 5.

The memory 504 may be used to store software programs and modules, such as program instructions/modules corresponding to the karaoke processing method in embodiments of the present disclosure. The processor 502 executes various function applications and data processing by running software programs and modules stored in the memory 504, to implement the above-described karaoke processing method. The memory 504 may include a high speed random access memory, and may include nonvolatile memory, such as one or more magnetic storage devices, flash memories, or other nonvolatile solid state memories. In some instances, the memory 504 may further include a memory remotely provided with respect to the processor 502, which may be connected to the device 500 via a network. Instances of the above-described networks include, but not limited to the Internet, the intranet, the local area network, the mobile communication network, and combinations thereof.

The transmission module 506 is used to receive or transmit data via a network. Specific instance of the above-described network may include a wired network and a wireless network. In an instance, the transmission module 506 includes a network interface controller (NIC) that can be connected to other network devices such as a router via a network cable to communicate with the Internet. In an instance, the transmission module 506 is a radio frequency (RF) module for wirelessly communicating with the Internet.

In the embodiments according to the present application, it should be understood that the disclosed system, device and method may be implemented in other ways. For example, the device embodiments described above are only illustrative. For example, the units are divided based on a logic function thereof, and they may be divided in another way in practice. For example, multiple units or components may be combined or integrated into another system, or some features may be omitted or not performed. In addition, a displayed or discussed coupling, direct coupling or communication connection may be an indirect coupling or communication connection via some interfaces, devices or units, and may be in an electrical form, a mechanical form or another form.

The units illustrated as separate components may be separated physically or not, and the component displayed as a unit may be a physical module or not. That is, the components may be located at the same place, or may be distributed on multiple network units. A part of or all of the units may be selected to realize the object of the solution of the embodiment according to actual need.

In addition, various functional units in various embodiments of the present disclosure may be integrated into one processing unit, the various functional units may also be separate physical units, or two or more units may be integrated into one unit. The above integrated units may be implemented by hardware or implemented by a software functional unit.

The integrated unit may also be stored in a computer readable storage medium in a case that the integrated unit is implemented by the software functional unit and sold or used as an independent product. Based on this understanding, the technical solution of the present disclosure, either essentially or in part, contributes to the prior art, or all or part of the technical solution may be embodied in the form of a software product stored in a storage medium, including several instructions for enabling a computer device (which may be a personal computer, a server, or a network device, etc.) to perform all or part of the steps of the method according to the various embodiments of the present disclosure. The aforementioned storage medium includes a variety of media capable of storing the program code such as a USB disk, a mobile hard disk, a read-only memory (ROM, Read-Only Memory), a random access memory (RAM, Random Access Memory), a magnetic disk, or an optical disk.

As described above, the above embodiments are merely provided for describing the technical solutions of the present disclosure, but are not intended to limit the present disclosure. Although the present disclosure is described in detail with reference to the foregoing embodiments, those skilled in the art should understand that, they can still modify technical solutions described in the foregoing embodiments, or make equivalent substitutions to a part or all of the technical features; and such modifications or substitutions do not make the essence of corresponding technical solutions to depart from the spirit and the scope of the embodiments of the present disclosure.

The invention claimed is:

1. A karaoke processing method, comprising:
    acquiring, by a server, an accompaniment audio file, an original vocal audio file and a lyrics file of a song, wherein the lyrics file comprises time information for identifying display time of lyrics;
    dividing, by the server, the lyrics file to obtain a first lyrics part and a second lyrics part and generating lyrics division information, wherein the lyrics division information comprises identification information for identifying the first lyrics part;
    generating, by the server, a target audio file by outputting the accompaniment audio file in the display time of the first lyrics part and outputting the original vocal audio file in the display time of the second lyrics part; and
    sending, by the server, the target audio file and a target lyrics file to a client upon reception of a karaoke request sent by the client, wherein the target lyrics file is obtained by adding the lyrics division information in the lyrics file.

2. The karaoke processing method according to claim 1, wherein the dividing by the server the lyrics file to obtain the first lyrics part and the second lyrics part comprises:
    determining, by the server, paragraph information of the lyrics file based on the time information; and
    dividing, by the server, the lyrics file based on the paragraph information to obtain the first lyrics part and the second lyrics part.

3. The karaoke processing method according to claim 1, wherein the dividing by the server the lyrics file to obtain the first lyrics part and the second lyrics part comprises:
    determining, by the server, a verse part and a refrain part of the lyrics file, and
    determining the verse part as the first lyrics part and the refrain part as the second lyrics part, or determining the refrain part as the first lyrics part and the verse part as the second lyrics part.

4. The karaoke processing method according to claim 1, wherein the dividing by the server the lyrics file to obtain the first lyrics part and the second lyrics part comprises:
    dividing, by the server, the lyrics file based on a custom template to obtain the first lyrics part and the second lyrics part.

5. The karaoke processing method according to claim 1, further comprising:
    performing, by the server, balance processing on the audio data of the target audio file at a switching point, wherein the switching point is the time point for switching from the display time corresponding to the first lyrics part to the display time corresponding to the second lyrics part, or the time point for switching from the display time corresponding to the second lyrics part to the display time corresponding to the first lyrics part.

6. The karaoke processing method according to claim 1, further comprising: providing, by the client, karaoke service to a user by using the target audio file as accompaniment audio and using the target lyrics file as lyrics to be played.

7. The karaoke processing method according to claim 6, wherein the providing by the client karaoke service to a user by using the target audio file as accompaniment audio and using the target lyrics file as lyrics to be played comprises:
    playing, by the client, the target audio file and the target lyrics file;
    recording, by the client, audio data of the user in the display time corresponding to the first lyrics part; and
    mixing, by the client, the audio data of the user and the target audio file to obtain an antiphonal singing file.

8. The karaoke processing method according to claim 7, further comprising:
    providing, by the client based on the lyrics division information, a first identifier for the first lyrics part displayed on the client and a second identifier for the second lyrics part displayed on the client.

9. A karaoke processing device, applied to a server, comprising:
    an acquisition unit configured to acquire an accompaniment audio file, an original vocal audio file and a lyrics file of a song, wherein the lyrics file comprises time information for identifying display time of lyrics;
    a processing unit configured to divide the lyrics file to obtain a first lyrics part and a second lyrics part, and generate lyrics division information, wherein the lyrics division information comprises identification information for identifying the first lyrics part;
    a generation unit configured to generate a target audio file by outputting the accompaniment audio file in the display time of the first lyrics part and outputting the original vocal audio file in the display time corresponding to the second lyrics part; and
    a sending unit configured to send the target audio file and a target lyrics file to a client upon reception of a karaoke request sent by the client, wherein the target lyrics file is obtained by adding the lyrics division information in the lyrics file.

10. The karaoke processing device according to claim 9, wherein
    the processing unit is configured to determine paragraph information of the lyrics file based on the time information, divide the lyrics file based on the paragraph information to obtain the first lyrics part and the second lyrics part.

11. The karaoke processing device according to claim 10, further comprising:
a balance processing unit configured to perform balance processing on the audio data of the target audio file at a switching point, wherein the switching point is the time point for switching from the display time corresponding to the first lyrics part to the display time corresponding to the second lyrics part, or the time point for switching from the display time corresponding to the second lyrics part to the display time corresponding to the first lyrics part.

12. The karaoke processing device according to claim 9, wherein the processing unit is configured to
determine a verse part and a refrain part of the lyrics file, and
determine the verse part as the first lyrics part and the refrain part as the second lyrics part, or determine the refrain part as the first lyrics part and the verse part as the second lyrics part.

13. The karaoke processing device according to claim 12, further comprising:
a balance processing unit configured to perform balance processing on the audio data of the target audio file at a switching point, wherein the switching point is the time point for switching from the display time corresponding to the first lyrics part to the display time corresponding to the second lyrics part, or the time point for switching from the display time corresponding to the second lyrics part to the display time corresponding to the first lyrics part.

14. The karaoke processing device according to claim 9, wherein
the processing unit is configured to divide the lyrics file based on a custom template to obtain the first lyrics part and the second lyrics part.

15. The karaoke processing device according to claim 14, further comprising:
a balance processing unit configured to perform balance processing on the audio data of the target audio file at a switching point, wherein the switching point is the time point for switching from the display time corresponding to the first lyrics part to the display time corresponding to the second lyrics part, or the time point for switching from the display time corresponding to the second lyrics part to the display time corresponding to the first lyrics part.

16. The karaoke processing device according to claim 9, further comprising:
a balance processing unit configured to perform balance processing on the audio data of the target audio file at a switching point, wherein the switching point is the time point for switching from the display time corresponding to the first lyrics part to the display time corresponding to the second lyrics part, or the time point for switching from the display time corresponding to the second lyrics part to the display time corresponding to the first lyrics part.

17. A karaoke processing system, comprising a server and a client, wherein
the server comprises the karaoke processing device according to claim 9; and
the client is configured to provide karaoke service to a user by using the target audio file as accompaniment audio and using the target lyrics file as lyrics to be played.

18. The karaoke according to claim 17, wherein the client is configured to
play the target audio file and the target lyrics file,
record audio data of the user in the display time corresponding to the first lyrics part based on the lyrics division information, and
mix the audio data of the user and the target audio file to obtain an antiphonal singing file.

19. The karaoke processing system according to claim 18, wherein
the client is further configured to provide, based on the lyrics division information, a first identifier for the first lyrics part displayed on the client and a second identifier for the second lyrics part displayed on the client.

* * * * *